United States Patent [19]

Phillips

[11] 3,754,441
[45] Aug. 28, 1973

[54] KNOTMETER
[76] Inventor: Charles W. Phillips, 2825 Newport Blvd., Costa Mesa, Calif.
[22] Filed: Jan. 19, 1972
[21] Appl. No.: 219,101

[52] U.S. Cl. .................................. 73/187, 73/431
[51] Int. Cl. ........................................... G01c 21/10
[58] Field of Search .............................. 73/187, 431

[56] References Cited
UNITED STATES PATENTS

| | | | |
|---|---|---|---|
| 1,894,211 | 1/1933 | Zink | 73/187 |
| 2,127,847 | 8/1938 | Schulte | 73/187 |
| 3,496,770 | 2/1970 | Fassett | 73/187 |
| 3,531,988 | 10/1970 | Casani et al. | 73/187 |

Primary Examiner—Donald O. Woodiel
Attorney—Harvey C. Nienow et al.

[57] ABSTRACT

The present invention relates to a "speed indicator or knotmeter," for indicating the speed of a boat; and more particularly, relates to a knotmeter "sending unit" that may be easily and quickly withdrawn from and inserted through the hull of a boat.

The ease with which the sending unit may be handled encourages preventive maintenance, and facilitates repair when this is necessary.

13 Claims, 6 Drawing Figures

Patented Aug. 28, 1973 3,754,441

Patented Aug. 28, 1973

KNOTMETER

BACKGROUND

In the navigation of boats, it is frequently desirable to know the boat's speed; in order to compute the distance that the boat has traveled in a given time, and in order to compute the instantaneous location of the boat. A system for providing this type of information is known as a speedometer or — more correctly — as a "knotmeter," since a "knot" is a nautical mile per hour. Such a knotmeter usually comprises two components; an "indicating meter" positioned in front of the pilot, and a "sending unit" that is affixed to the boat below the water line.

There are numerous types of knotmeters; i.e., wand type, thermal type, water-pressure type; but, in the most commonly used types, the underwater sending unit usually comprises a rotatable "active element" incorporating means such as vanes, a propeller, or the like that rotates at a speed corresponding to the water flow pattern produced by the moving boat. The rotatable active element of the sending unit is preferably placed in an underwater location, where it is exposed to a relatively smooth uninterrupted "laminar" water flow as the boat moves through the water. Preferred positions for the sending unit are vertically through the bottom of the boat, or horizontally through the boat's keel; preferably being positioned an appreciable distance away from other underwater protrusions.

The underwater sending unit may be connected to the indicating meter in a number of ways, depending upon its design. For example, some knotmeters use a flexible connecting cable that rotates in accordance with the rotation of the active element; and in this way activates the indicating meter in the same manner as the speedometer of an automobile. However, such a connecting cable has the disadvantage that bends, kinks, and the like tend to degrade the operation of the knotmeter.

In another type of knotmeter, the sending unit acts as a miniature electrical generator; so that the rotation of the active element produces an electrical signal that is fed over electrical wires to the indicating meter, which responds to the electrical signals. This type of knotmeter tends to be the preferred type.

As indicated above, the sending unit is located below the water surface; and, as a result, is therefore exposed to the action of the water — tending to foul, to bind, to accumulate barnacles, etc. It therefore becomes necessary to periodically remove the underwater sending unit for the purpose of repair and preventative maintenance; and many boat owners feel that it is desirable to remove the underwater sending unit whenever the boat is not in use, to prevent fouling when not in use.

One drawback of prior art knotmeters is the difficulty of removing and replacing the underwater sending unit; the prior art procedure being to withdraw the sending unit into the boat, aNd to quickly plug or cap the hole from which the sending unit was removed. Unfortunately, even at best, this prior art procedure permits an appreciable amount of water to enter the boat before the plug is properly positioned; and if there is any difficulty in placing the plug, a large amount of water enters the boat.

A similar water ingress situation results when the sending unit is to be inserted.

Because of the difficulty of removing and inserting the sending unit, the sending unit tends to be left in place unduly long; this being undesirable because of the unknown amount of degradation that takes place, and because normal marine fouling impairs the accuracy of the speed reading.

OBJECTS AND DRAWINGS

It is therefore the principal objective of the present invention to provide an improved knotmeter.

It is another object of the present invention to provide an improved knotmeter that practically eliminates the ingress of water while removing or inserting the underwater sending unit.

It is still another objective of the present invention to provide an improved knotmeter that permits the underwater sending unit to be quickly and easily removed and/or replaced.

It is a further objective of the present invention to provide an improved knotmeter that has a housing designed to prevent or minimize the ingress of water.

It is a still further objective of the present invention to provide an improved knotmeter that may be retrofitted onto existent boats.

It is a still further objective of the present invention to provide a capability for reducing and preventing marine fouling with minimum effort.

The attainment of these objects and others will be realized from the following description taken in conjunction with the drawings of which:

SYNOPSIS

Broadly speaking, the present invention involves a knotmeter sending unit that is encased in a housing adapted to be placed in an outboard position for normal usage of the knotmeter, and to be placed in an inboard position for servicing and removing the sending unit.

Suitable water seals are provided to prevent water leakage; and a plurality of locking means are provided for preventing inadvertent moving of the various component parts.

INTRODUCTION

The Bushing

Figure 1:
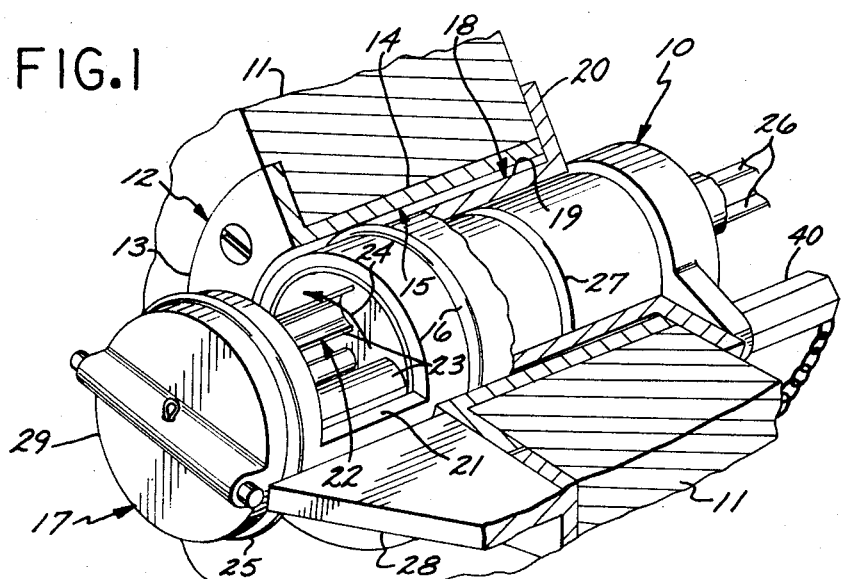
FIG. 1 shows a pictorial view of the sending unit and its housing in its outboard position, as viewed from the outside of the boat.

The present invention will be understood from FIG. 1, which shows the normal operative "outboard" position of the underwater position of a knotmeter as mounted on a boat; FIG. 1 showing the installation from the outside of the boat. In this illustration, the boat hull 11 is indicated to have a bushing 12 fixedly installed through the hull 11; the outer surface of the bushing flange 13 being flush with the outer surface of the boat hull 11 — the bushing 12 and the bushing flange 13 being affixed to the boat hull 11 in any suitable manner (such as screws, bolts, etc.). Bushing 12 has an integral tubular sleeve 14 that extends through the boat hull 11, and terminates inside the boat; bushing sleeve 14 having a smooth accurately dimensioned inner surface 15. For reasons that will be discussed later, bushing sleeve 14 will be designated as the "outer sleeve 14."

The Housing

Positioned slidably in bushing 12 is a cylindrical housing 17, shown in its "outboard" position, in which it extends beyond the surface of the boat hull 11; and protrudes into the water. Housing 17 comprises a tubular "inner" sleeve 18 whose outer surface 19 is smooth and accurately dimensions to form a sliding fit with the inner surface 15 of the outer sleeve 14; the proximal surface of the housing sleeve 18 and the bushing sleeve 14 being designated as the "housing/bushing interface."

As may be seen from FIG. 1, when the housing 17 is in its outboard position, water may possibly leak into the boat through the above discussed housing/bushing interface; and in order to prevent such water leakage, an "inner" seal — such as an O-ring 16 — is fitted into the bushing/housing interface, e.g., between the inner and outer sleeve 14 and 18. Preferably, the inner O-ring 16 is fitted into a suitable peripheral groove in the housing sleeve 18.

Moreover, for reasons to be discussed later, an "outer" seal — such as outer O-ring 25 — is similarly positioned near the end of the housing sleeve 18.

Housing 17 terminates in a housing flange 20 that is located inside the boat.

The Sending Unit

The portion of housing sleeve 18 between the O-rings 16 and 25 contains a window 21 through which may be seen the rotatable active element 22 of the sending unit 10; the active element 22 being illustrated as comprising a plurality of vanes 23 that rotate — as indicated by arrow 24 — when the water flows past the boat hull 11 and the window 21. As the vanes 23 rotate, their rotation produces an electrical signal that is transmitted over wires 26, the electrical signal being applied to the indicating meter, as discussed above.

For convenience, the proximal surfaces of the housing sleeve 18 and the sending unit 10 will be designated as the "housing/sending unit interface."

It will be noted, from FIG. 1, that when the housing 17 is in its outboard position, water may leak into the boat through the window 21 and the housing/sending unit interface. In order to prevent such water leakage, a third seal — such as an O-ring 27 — is fitted into the housing/sending unit interface. Preferably, this third O-ring 27 is fitted into a suitable peripheral groove in the sending unit 10.

The Water Flow Pattern

It is preferable that the vanes 23 of the sending unit 10 be exposed to a smooth laminar flow of water; and to accomplish this result, a water fin 28 is used to smooth out any water turbulence before the turbulence reaches the vanes 23. The water fin 28 also protects the housing against external damage when in the outboard position. The uncut lower portion of the housing sleeve 18 protects the lower section of the vanes from water flow; and thus aids in the production of the water speed signals by removing the resistance to vane rotation that would be produced by water pressure on the back side of the vanes.

Operation of the Sending Unit

The installation indicated in FIG. 1 operates in such a way that as the water flows past the boat hull 11 it causes rotation of the vanes 23; and those produce an electrical signal that causes the indicating meter to show the boat speed.

As shown in FIG. 1, the sealing O-rings 16 and 27 act as seals that prevent the leakage of water into the boat during the normal outboard positioning of the housing 17.

Removal of the Sending Unit (I)

It was previously pointed out that the sending unit must be frequently removed; and, in the past, a plug or a cap was used to close the opening when this was done; but, unfortunately, the time interval between the removal of the sending unit and the installation of the plug or cap permitted an appreciable amount of water to enter the boat. Similarly, the removal of the plug or cap, and the insertion of the sending unit also permitted an appreciable amount of water to enter the boat.

Figure 2:
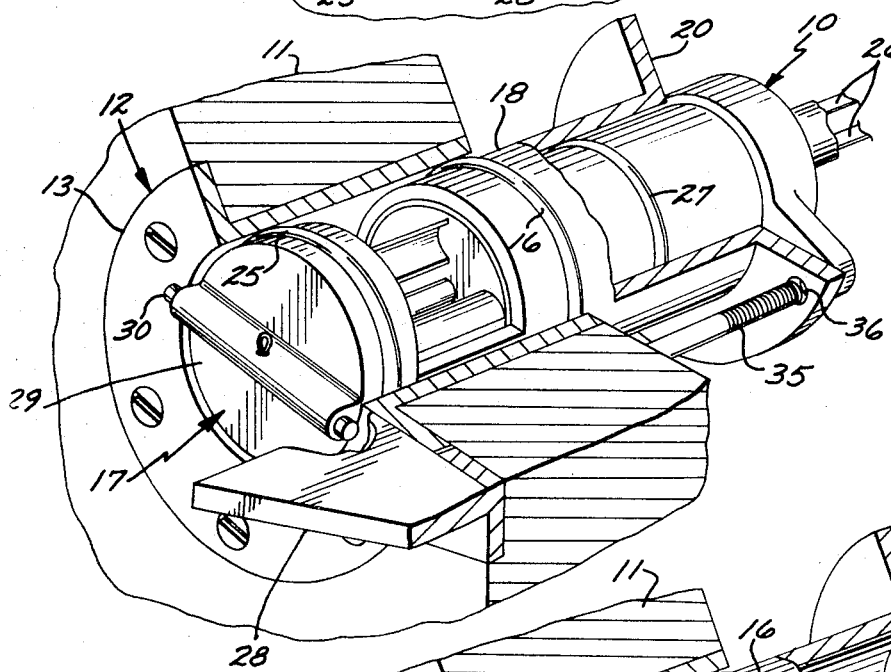
FIG. 2 shows a pictorial view of the sending unit and its housing in its inboard position, as viewed from the outside of the boat.

The present invention solves this removal and insertion problem as follows. When the sending unit is to be removed, the housing 17 — and its contained sending unit — is pulled into its inboard position; as indicated in FIG. 2. A suitable stopping pin 30 now abuts the bushing flange 13 to establish the inboard position.

While the housing 17 is being moved from its outboard position to its inboard position, O-rings 16 and 27 continue to prevent leakage of water into the boat; and when the housing 17 finally achieves its inboard position as indicated in FIG. 2, the outer O-ring 25 now fits into the housing/bushing interface; and thus prevents water leakage into the boat.

It should be noted that at this time, when the housing 17 is in its inboard position, the outer end 29 of the housing 17 is flush with the boat hull 11; and thus permits an unimpeded movement of the boat through the water.

Figure 3:
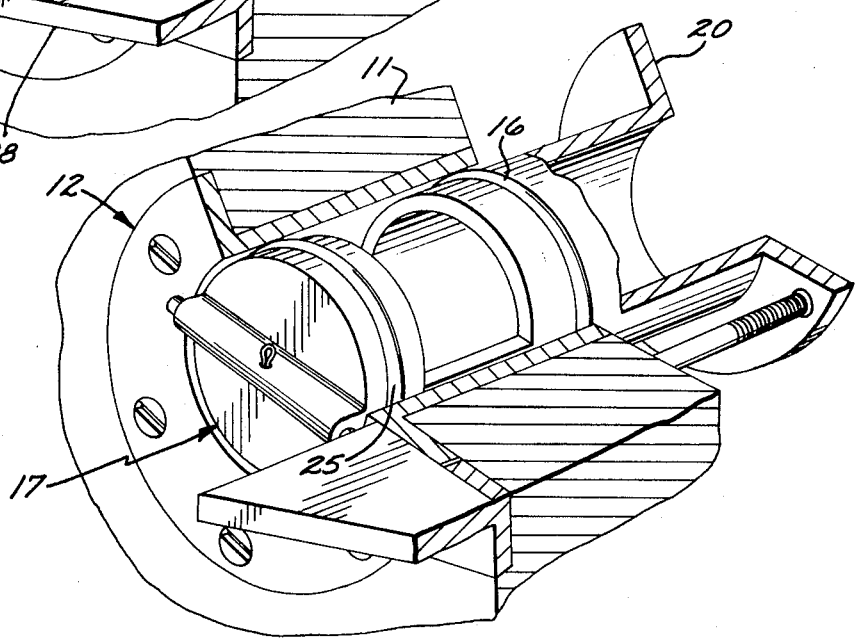
FIG. 3 shows a pictorial view of the sending unit housing in its inboard position, as viewed from the outside of the boat; the sending unit having been removed from the housing.

The next step in the removal of the sending unit 10 is the actual withdrawing of the sending unit from the housing 17, while the housing is held in its inboard position — the holding apparatus will be discussed later. When this actual withdrawal has been accomplished, the bushing 12 and the empty housing 17 appear as indicated in FIG. 3. It will be noted that, at this time, when the housing 17 is in its inboard position, water leakage into the boat is prevented by the action of the outer sealing O-ring 25.

Locked Outboard Position

Figure 4:
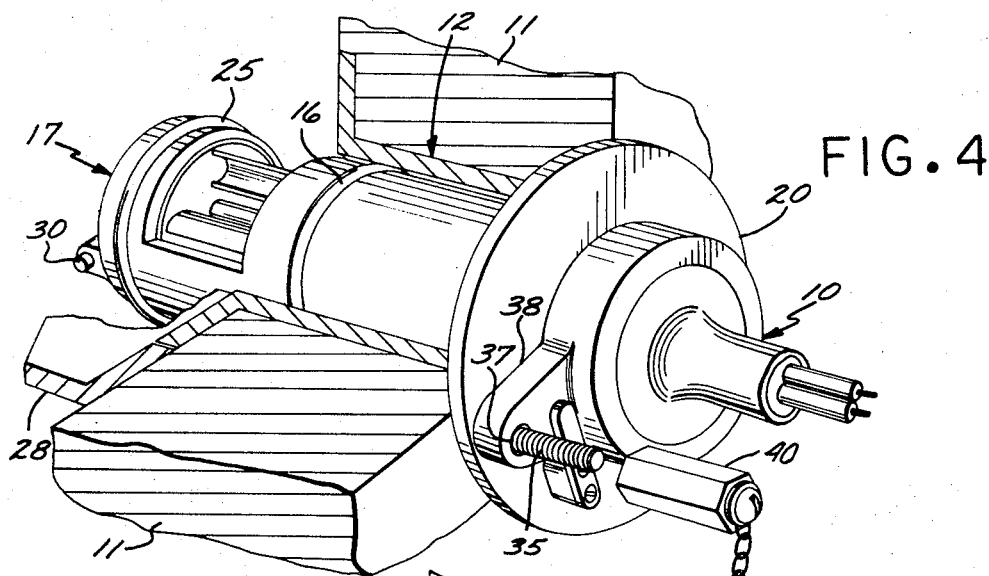
FIG. 4 shows a pictorial view of the sending unit and its housing in its outboard position, as viewed from the inside of the boat.
Figure 5:
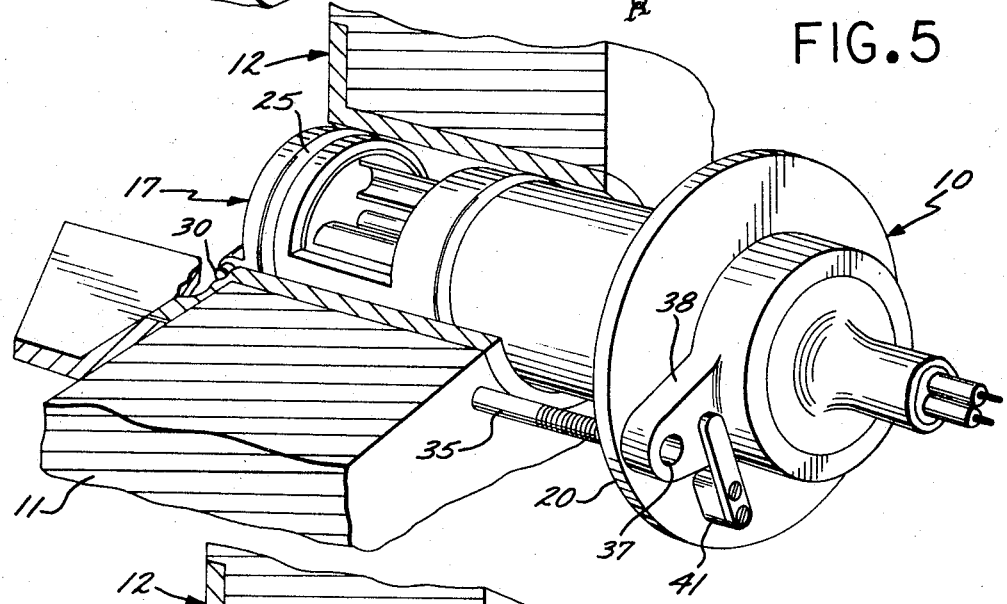
FIG. 5 shows a pictorial view of the sending unit and its housing in its inboard position, as viewed from the inside of the boat.
Figure 6:
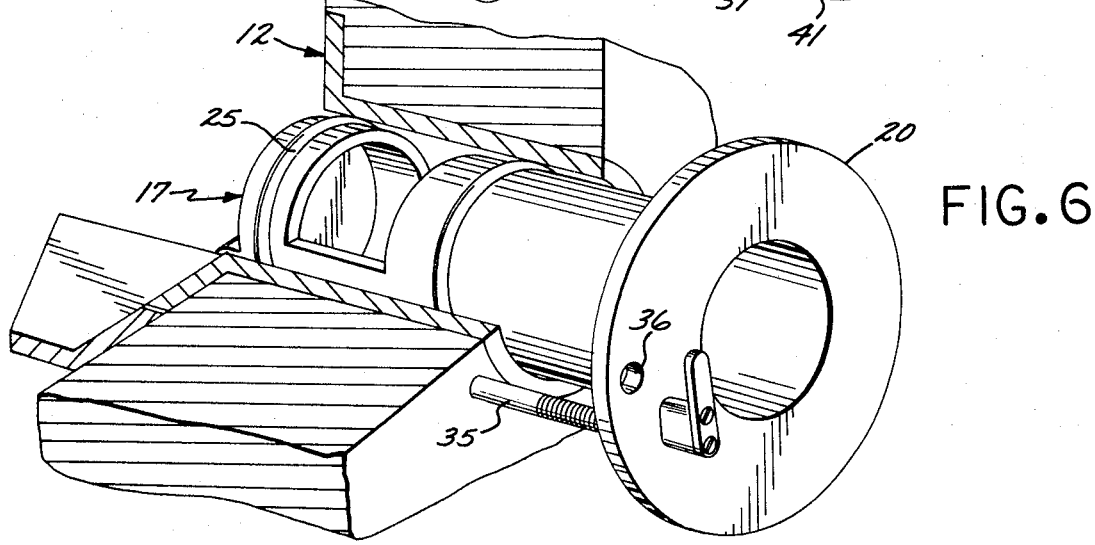
FIG. 6 shows a pictorial view of the sending unit housing in its inboard position, as viewed from the inside of the boat; the sending unit having been removed from the housing.

The operation of the invention will be further understood from FIGS. 4, 5, and 6 — these being views of the apparatus as seen from the inside of the boat. FIG. 4, for example, shows the apparatus as it appears when the housing 17 is in an outboard position — and contains the sending unit 10. FIG. 4 shows the sending unit 10 to be fully inserted into the housing 17, which is in turn inserted into the bushing 12; water leakage being prevented by the O-rings as discussed previously.

In order to lock the various components in place for normal operation, and to prevent leakage of water it has been found desirable to use locking means such as a locking stud 35 that traverses a first locking aperture 36 (not visible in FIG. 4) of housing flange 20; and also traverses a second locking aperture 37 of a sending unit arm 38. A suitable locking nut 40 assures that the various parts are locked in their normal operating outboard positions.

Removal of the Sending Unit (II)

When the sending unit 10 is to be removed, the locking nut 40 is released (see FIG. 4); and the housing 17 and its contained sending unit 10 are simultaneously pulled into the inboard position, as discussed previously and as shown in FIG. 5. At this time, the outer O-ring 25 now prevents leakage of water into the boat; and the stopping pin 30 holds the housing 17 from being completely drawn into the boat.

In order to assure that the housing 17 and the bushing 12 retain the sealed inboard position relationship, locking stud 35 has a suitable length, such that when the housing flange 20 is rotated away from the stud 35/aperture 36 alignment, (see FIG. 6), the housing flange 20 cannot be inadvertently pushed forward to a position that would destroy the sealing relationship established by the outer O-ring 35. Thus, the housing 17 and the outer O-ring 25 are held in a sealing relationship with the bushing 12, so that ingress of water is prevented.

In order to actually remove the sending unit 10, it is now pulled out of the housing 17; the housing 17 still retaining its sealing relationship with the bushing 12. As indicated in FIG. 6, the sending unit may now be completely removed from the housing 17 to be cleaned, repaired, or replaced, as may be necessary.

In order to prevent the inadvertent removal of the sending unit 10 from the housing 17 when the housing is not in its inboard position, FIG. 5 shows the use of an L-shaped locking block 41 that coacts with the locking stud 35 to hold together the sending unit 10 and the housing flange 20, because of the interrelation of the locking stud 35, the apertures 36 and 37, and the locking block 41, the combination housing flange 20 and the sending unit 10 must be withdrawn to the inboard position simultaneously as a unit — thus retaining the water sealing relationship established by the various O-rings. Only when the housing flange 20 has been pulled behind the end of the locking stud 35 can the sending unit 10 be removed; and at this time the housing 17 is rotated to be held in place by the coaction of the stopping pin 30, the housing flange 20, and the locking stud 35.

Insertion of the Sending Unit

When the sending unit is to be inserted, the above operations are performed in the reverse order. The sending unit is first inserted into the dry empty housing 17 of FIG. 6; the end of the locking stud 35 causing the rotated housing flange 20 to retain the housing/bushing sealing relationship during the sending unit replacement. Once the sending unit has been properly inserted into the housing 17, the sending unit 10 is rotated — say counterclockwise as indicated in FIG. 5 — until its locking arm 38 engages the L-shaped locking block 41; and then the sending unit 10 and the housing 17 are simultaneously rotated until the locking apertures 36 and 37 are aligned with the locking stud 35. Now, the sending unit 10 and the housing 17 are simultaneously pushed forward until they assume the outboard position indicated in FIGS. 1 and 4. At this time, the locking nut 40 may be affixed, to retain the desired operational outboard location of the various parts of the knotmeter structure.

It will be noted that none of the sealing O-rings are exposed to rotational movement; acting only as static seals against water leakage.

SUMMARY

The present invention has many advantages over prior art devices of the kind. First of all, it facilitates the removal and the insertion of the knotmeter's sending unit. Second, the insertion of the sending unit is accomplished with absolutely no ingress of water into the boat. Third, the removal of the sending unit is achieved with minimal ingress of water into the boat. Fourth, the ease of removing and installing the sending unit encourages preventive maintenance and servicing. Fifth, the ease of removal and installation of the sending unit facilitates repairs when such are necessary. Sixth, suitable locking devices prevent inadvertent moving of a component part. And finally, the disclosed apparatus is easily retrofitted onto an existent boat.

What is claimed is:

1. The combination comprising:
   a housing adapted to have an inboard position relative to a water-restraining wall;
   first means for sealing against water leakage when said housing is in said inboard position;
   second sealing means for sealing against water leakage when said housing is in said outboard position;
   means for inserting a water-responsive device into said housing from the dry side of said wall when said housing is in the inboard position;
   said first sealing means preventing ingress of water during said inserting procedure;
   means for removing a water-responsive device from said housing to the dry side of said wall when said housing is in said inboard position;
   said first sealing means preventing ingress of water during said removal procedure;
   means for moving said housing to said outboard position for subjecting said device to said water.

2. The combination of claim 1 including a longitudinal window in the sidewall of said housing;
   said window adapted to permit water to enter said housing when said housing is in said outboard position.

3. The combination of claim 2 wherein said first and said second sealing means comprise O-rings;
   one O-ring being positioned to either side of said window.

4. The combination of claim 2 including a water responsive device positioned in said housing;
   said device being exposed to water when said housing is in said outboard position.

5. The combination of claim 2 wherein said device is the sending unit of a knotmeter.

6. The combination comprising;
   a housing adapted to have an inboard position and an outboard position relative to th hull of a boat;
   said housing having a longitudinal window through its sidewall, said window being window adapted to permit water to enter said housing when said housing is in said outboard position;

a bushing fixedly positioned in said hull, said bushing being adapted to permit said housing to assume said inboard and said outboard positions;

first means for sealing the housing/bushing interface against water leakage when said housing is in said inboard position;

second means for sealing the housing/bushing interface against water leakage when said housing is in said outboard position;

a water responsive device positioned in said housing;

said device being exposed to water when said housing is in said outboard position;

means for sealing said housing/device interface against water leakage;

means for removing said water-responsive device from said housing in the interior of said boat when said housing is in said inboard position;

said first sealing means preventing ingress of water into said boat during said removal procedure;

means for inserting such a water-responsive device into said housing from the interior of said boat when said housing is in said inboard position;

said first sealing means preventing ingress of water into said boat during said inserting procedure.

7. The combination of claim 6 wherein said water responsive device is the sending unit of a knotmeter.

8. The combination comprising:

a housing adapted to have an inboard position and an outboard position relative to the hull of a boat;

said housing having a window adapted to permit water to enter said housing when said housing is in said outboard position;

said housing having a tubular sleeve adapted to permit said housing to assume said inboard position and said outboard position;

a bushing fixedly position through said boat-hull, said bushing having a tubular sleeve adapted to encircle said tubular sleeve of said housing;

said tubular sleeve of said housing being adapted to slide longitudinally in said tubular sleeve of said bushing for permitted said housing to assume said inboard and said outboard positions;

means, comprising a stopping pin positioned at the end of said housing, for stopping said housing in said inboard position;

means for sealing the housing sleeve/bushing sleeve interface against water leakage when said housing is in said inboard position;

means for sealing the housing sleeve/bushing sleeve interface against water leakage when said housing is in said outboard position;

a knotmeter sending unit, having an active element, positioned in said housing;

said active element being positioned at said window of said housing;

said active element of said sending unit being adapted to be exposed to water flow pattern when said housing is in said outboard position;

said sending unit being protected from water flow pattern when said housing is in said inboard position;

means for sealing said housing/sending unit interface against water leakage.

9. The combination of claim 8 including means, comprising a flange on said housing, for locking said housing against being inadvertently moved from said inboard position to said outboard position.

10. The combination of claim 8 including means, comprising an arm associated with said sending unit, for preventing said sending unit from being inadvertently withdrawn from said housing when said housing is in said outboard position.

11. The combination of claim 8 including means, comprising a water fin, for producing a laminar water flow pattern adjacent said window when said housing is in said outboard position.

12. The combination of claim 8 including means for protecting said housing against external damage when said housing is in said outboard position.

13. The combination of claim 8 wherein said sealing means comprise O-rings.

* * * * *